(12) United States Patent
Schuermann et al.

(10) Patent No.: US 11,292,365 B2
(45) Date of Patent: Apr. 5, 2022

(54) ADJUSTING DEVICE FOR A VEHICLE SEAT, AND METHOD FOR ASSEMBLING AN ADJUSTING DEVICE

(71) Applicant: Adient Luxembourg Holding S.à r.l., Luxembourg (LU)

(72) Inventors: Thorsten Schuermann, Odenthal (DE); Andreas Hoffmann, Wuelfrath (DE); Tamas Poczik, Cologne (DE); Ivica Stanic, Dormagen (DE); Oliver Kuntz, Wermelskirchen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 320 days.

(21) Appl. No.: 16/335,055

(22) PCT Filed: Sep. 20, 2017

(86) PCT No.: PCT/EP2017/073790
§ 371 (c)(1),
(2) Date: Mar. 20, 2019

(87) PCT Pub. No.: WO2018/054980
PCT Pub. Date: Mar. 29, 2018

(65) Prior Publication Data
US 2019/0275914 A1    Sep. 12, 2019

(30) Foreign Application Priority Data

Sep. 21, 2016 (DE) .................... 10 2016 218 065.7
Dec. 21, 2016 (DE) .................... 10 2016 225 835.4

(51) Int. Cl.
*B60N 2/02*    (2006.01)
*B60N 2/06*    (2006.01)
(Continued)

(52) U.S. Cl.
CPC ............ *B60N 2/0232* (2013.01); *B60N 2/02* (2013.01); *B60N 2/06* (2013.01); *B60N 2/07* (2013.01);
(Continued)

(58) Field of Classification Search
CPC .. B60N 2/0232; B60N 2/02; B60N 2002/024; B60N 2/07; B60N 2/06; H02K 5/24
(Continued)

(56) References Cited

U.S. PATENT DOCUMENTS 4,678,231 A * 7/1987 Chizek ................. A47C 1/0242
297/329
4,712,637 A * 12/1987 Mogi ..................... B62K 11/04
180/219
(Continued)

FOREIGN PATENT DOCUMENTS

CN    101244701 A    8/2008
CN    104290615 A    1/2015
(Continued)

OTHER PUBLICATIONS

China National Intllectual Property Administration, Chinese Office Action in Application No. 201780057811.7, dated Nov. 27, 2020, 8 pages.

*Primary Examiner* — Milton Nelson, Jr.
(74) *Attorney, Agent, or Firm* — Marshall & Melhorn, LLC (57) ABSTRACT

An adjusting device for a vehicle seat may have a first adjustable assembly, a second adjustable assembly, and an electric motor. The electric motor may be operatively connected both to an adjustment gearing of the first adjustable assembly as well as to an adjustment gearing of the second adjustable assembly by at least one output shaft. A motor support may be provided which receives the electric motor,
(Continued)

and the motor support may be secured to the two adjustable assemblies via a respective adapter. The motor support may have a metal material as a single piece. The adapters may be made of a non-metal material. A method for assembling the adjusting device may include first securing the adapters to the respective paired adjustable assembly. The motor support may be connected to the adapters in an additional step.

20 Claims, 4 Drawing Sheets

(51) Int. Cl.
  *F16H 25/20* (2006.01)
  *H02K 5/24* (2006.01)
  *B60N 2/07* (2006.01)
(52) U.S. Cl.
  CPC ............... *F16H 25/20* (2013.01); *H02K 5/24* (2013.01); *B60N 2002/024* (2013.01)
(58) Field of Classification Search
  USPC ............................... 297/344.1, 330; 248/429
  See application file for complete search history.

(56) References Cited

U.S. PATENT DOCUMENTS

| | | | | |
|---|---|---|---|---|
| 4,802,374 | A * | 2/1989 | Hamelin | B60N 2/0232 |
| | | | | 248/429 |
| 7,658,429 | B2 * | 2/2010 | Koga | B60N 2/067 |
| | | | | 296/65.15 |
| 2006/0260424 | A1 | 11/2006 | Becker et al. | |
| 2008/0105810 | A1 * | 5/2008 | Hofschulte | B60N 2/06 |
| | | | | 248/429 |
| 2009/0272869 | A1 * | 11/2009 | Beneker | B60N 2/067 |
| | | | | 248/429 |

FOREIGN PATENT DOCUMENTS

| | | |
|---|---|---|
| CN | 104802667 A | 7/2015 |
| DE | 10 2009 004 365 A1 | 7/2009 |
| DE | 10 2011 052 058 A1 | 1/2013 |
| DE | 10 2007 060 882 B4 | 9/2013 |
| DE | 10 2014 011 025 A1 | 1/2016 |
| EP | 1 972 488 A2 | 9/2008 |
| EP | 1972488 A2 | 9/2008 |
| FR | 2 928 880 A1 | 9/2009 |
| FR | 3 001 667 A1 | 8/2014 |
| KR | 20070049754 A | 5/2007 |
| WO | 2014/033393 A1 | 3/2014 |

* cited by examiner

ADJUSTING DEVICE FOR A VEHICLE SEAT, AND METHOD FOR ASSEMBLING AN ADJUSTING DEVICE

CROSS REFERENCE TO RELATED APPLICATIONS

This application is a United States National Phase Application of International Application PCT/EP2017/073790, filed Sep. 20, 2017, and claims the benefit of priority under 35 U.S.C. § 119 of German Applications 10 2016 218 065.7, filed Sep. 21, 2016 and 10 2016 225 835.4, filed Dec. 21, 2016, the entire contents of which are incorporated herein by reference.

TECHNICAL FIELD

The invention relates to an adjusting device for a vehicle seat, comprising a first adjustable assembly, a second adjustable assembly, and comprising an electric motor, wherein the electric motor is operatively connected both to an adjusting gearing of the first adjustable assembly and to an adjusting gearing of the second adjustable assembly by means of at least one output shaft, wherein a motor carrier is provided which receives the electric motor, wherein the motor carrier is fastened to each of the two adjustable assemblies by means of an adapter. The invention also relates to a method for assembling an adjusting device.

TECHNICAL BACKGROUND

DE 10 2009 004 365 A1 discloses a longitudinal adjusting device for a vehicle seat, comprising a left pair of rails, comprising a right pair of rails and comprising an electric motor, wherein each pair of rails has a seat rail and a floor rail, each pair of rails is assigned an output shaft which permits an adjusting movement of the seat rail relative to the floor rail. The electric motor has an output shaft which is connected both to the adjusting gearing of the left pair of rails and to the adjusting gearing of the right pair of rails. A motor carrier is connected to the seat rail of the left pair of rails and to the seat rail of the right pair of rails. The motor carrier receives the electric motor and forms a guide for the output shaft of the electric motor, wherein the output shaft runs parallel to a longitudinal direction of the motor carrier, and the output shaft is connected on one side of the electric motor to the adjusting gearing of the left pair of rails and on the other side of the electric motor to the adjusting gearing of the right pair of rails. DE 10 2007 060 882 B4 discloses an adjusting device for a vehicle seat, comprising a first adjustable assembly, a second adjustable assembly, and comprising an electric motor, wherein the electric motor is operatively connected both to an adjusting gearing of the first adjustable assembly and to an adjusting gearing of the second adjustable assembly by means of two output shafts, wherein a motor carrier is provided which receives the electric motor. The motor carrier comprises a tube, at the ends of which a composite carrier with fastening receptacles is in each case arranged, and also a sheet metal body for receiving the electric motor. The fastening receptacles are each fastened to the two adjustable assemblies by means of an adapter. FR 2 928 880 A1 discloses an adjusting device for a vehicle seat, comprising a first adjustable assembly, a second adjustable assembly, and comprising an electric motor, wherein the electric motor is operatively connected both to an adjusting gearing of the first adjustable assembly and to an adjusting gearing of the second adjustable assembly by means of two output shafts, wherein a motor carrier is provided which receives the electric motor. The motor carrier is produced in one part from plastic and, at its two ends, in each case has an adapter which is integrated in one piece in the motor carrier for fastening the motor carrier to the two adjustable assemblies. In addition, DE 10 2011 052 058 A1 discloses a motor carrier of this type.

SUMMARY

The invention is based on the object of improving an adjusting device, in particular a longitudinal adjusting device, with a motor carrier of the type mentioned at the beginning In particular, the intention is to acoustically optimize the interfaces of the motor carrier with the seat rails. In particular, the intention is for vibration decoupling to take place between an electric motor and the seat rails. In addition, the intention is in particular to provide a testable and transportable unit of a pair of seat rails, wherein the pairs of seat rails can be mounted together with the motor carrier to form a complete adjusting device. In particular, it is intended for the motor carrier to be mounted on the seat rails in the transverse direction of the vehicle. In particular, the intention is for a connection of the motor carrier to the seat rails to be independent of a screw connection of a gearing housing of an adjusting gearing to the seat rail.

This object is achieved according to the invention by an adjusting device for a vehicle seat, comprising a first adjustable assembly, a second adjustable assembly, and comprising an electric motor, wherein the electric motor is operatively connected both to an adjusting gearing of the first adjustable assembly and to an adjusting gearing of the second adjustable assembly by means of at least one output shaft, wherein a motor carrier is provided which receives the electric motor, and the motor carrier is fastened to each of the two adjustable assemblies by means of an adapter, wherein the motor carrier is manufactured integrally from a metallic material, and the adapters are manufactured from a non-metallic material.

As a result of the motor carrier being manufactured integrally from a metallic material, and the adapters being manufactured from a non-metallic material, the interfaces of the motor carrier with the seat rails are acoustically optimized and vibration decoupling is provided between the electric motor and the seat rails.

The adapters are manufactured from a non-metallic material. Metallic noises in the interface between the motor carrier and the adapters can thereby be reduced. The adapters can be manufactured from a plastic. The motor carrier can be fastened to the two adjustable assemblies by means of two adapters. A first adapter for fastening the motor carrier to the first assembly can be manufactured from a different material than a second adapter for fastening the motor carrier to the second assembly, in particular if the loading on the motor carrier is not distributed symmetrically.

The motor carrier is manufactured from a metallic material, in particular from steel. The motor carrier can thus have a high degree of rigidity and strength. Nevertheless, a metallic formation of noise can be avoided by fastening the motor carrier to non-metallic adapters.

The adjusting device according to the invention is preferably designed as a longitudinal adjusting device for a vehicle seat. However, the adjusting device according to the invention can also be used in other applications, for example in height adjusting devices for vehicle seats.

The first adjustable assembly can be a pair of rails. The second adjustable assembly can be a pair of rails.

At least one of the adapters can have at least one pin for receiving the motor carrier. Each of the two adapters preferably has precisely two pins for receiving the motor carrier. The pins are particularly preferably oriented in a transverse direction. As a result, the motor carrier can simply be pushed in the transverse direction onto the pins. The motor carrier preferably has corresponding openings corresponding to the pins of the adapters.

The motor carrier can have at least one opening for the insertion of a bearing bushing. At least one bearing bushing which is inserted into an opening in the motor carrier can be plugged onto a pin of an adapter. The bearing bushing is preferably manufactured from an acoustically readily damping material. The bearing bushing can be a rubber grommet. Each pairing is preferably acoustically decoupled from an opening in the motor carrier and a pin of one of the adapters by means of a bearing bushing.

The motor carrier can have at least one finger which is pushed into a receiving opening in an adapter. The motor carrier preferably has two end regions with two fingers each. The fingers are preferably pushed in the transverse direction into corresponding receiving openings in the adapters. The number of fingers preferably corresponds to the number of receiving openings, and therefore each finger engages in precisely one assigned receiving opening.

A receiving opening is preferably shaped in a complementary manner to the assigned finger. The at least one finger can be deformed in such a manner that the at least one finger is held in a form-fitting manner in the transverse direction in the receiving opening by means of a deformation. The finger preferably has at least one edge which is deformed after being pushed into the associated receiving opening, and therefore a form fit which is effective in the transverse direction is provided.

The object is also achieved by a method for assembling an adjusting device according to the invention, wherein first of all the adapters are fastened to the two adjustable assemblies, and, in a further method step, the motor carrier is connected to the adapters. When the adjusting device is designed as a longitudinal adjusting device, each pair of rails can thereby be assembled by assembly of an adapter to form a functional and testable assembly group. As a result, for example, the assembly of the pairs of rails and the checking of the function thereof can take place in a first assembly plant, and the assembly of the individual pairs of rails to form a longitudinal adjusting device can subsequently take place in another assembly plant. This saves transport volumes in particular since the pairs of rails and the motor carriers can be packaged individually very compactly, whereas a ready assembled longitudinal adjusting device requires a comparatively large transport volume because of the many unfilled intermediate spaces.

In summary and described in other words, the invention provides an adjusting device in which a non-metallic adapter is mounted on the rail together with a gearing housing of an adjusting gearing. Said adapter serves for receiving the motor carrier. The motor carrier is fixed and secured on the adapter by means of a clip geometry or a deformation.

The invention is explained in more detail below with reference to advantageous exemplary embodiments which are illustrated in the figures. However, the invention is not restricted to said exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4b is a perspective detailed view of the first exemplary embodiment after the assembly step from FIG. 4a;

FIG. 6b is a perspective detailed view of the second exemplary embodiment after the assembly step from FIG. 6a;

DESCRIPTION OF PREFERRED EMBODIMENTS

Referring to the drawings, an adjusting device 10 which is known from the prior art and is designed as a longitudinal adjusting device, a motor carrier 40 which is known from the prior art, and also two adjusting devices 100, 200 according to the invention and designed as longitudinal adjusting devices will be described below using three directions in space running perpendicularly to one another. When the adjusting device 10, 100, 200 is installed in the vehicle, a longitudinal direction x runs substantially horizontally and preferably parallel to a vehicle longitudinal direction, which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. When the adjusting device 10, 100, 200 is installed in the vehicle, the vertical direction z runs parallel to the vehicle vertical axis.

The position and direction details used, such as, for example, front, rear, top and bottom, relate to a viewing direction of an occupant sitting in a normal sitting position on a vehicle seat having the adjusting device 10, 100, 200, wherein the vehicle seat installed in the vehicle in a use position, which is suitable for conveying an individual and where the seat back is upright, is oriented as customary in the direction of travel. However, a vehicle seat comprising an adjusting device 100, 200 according to the invention can also be installed in a different orientation, for example transversely with respect to the direction of travel.

Figure 1:
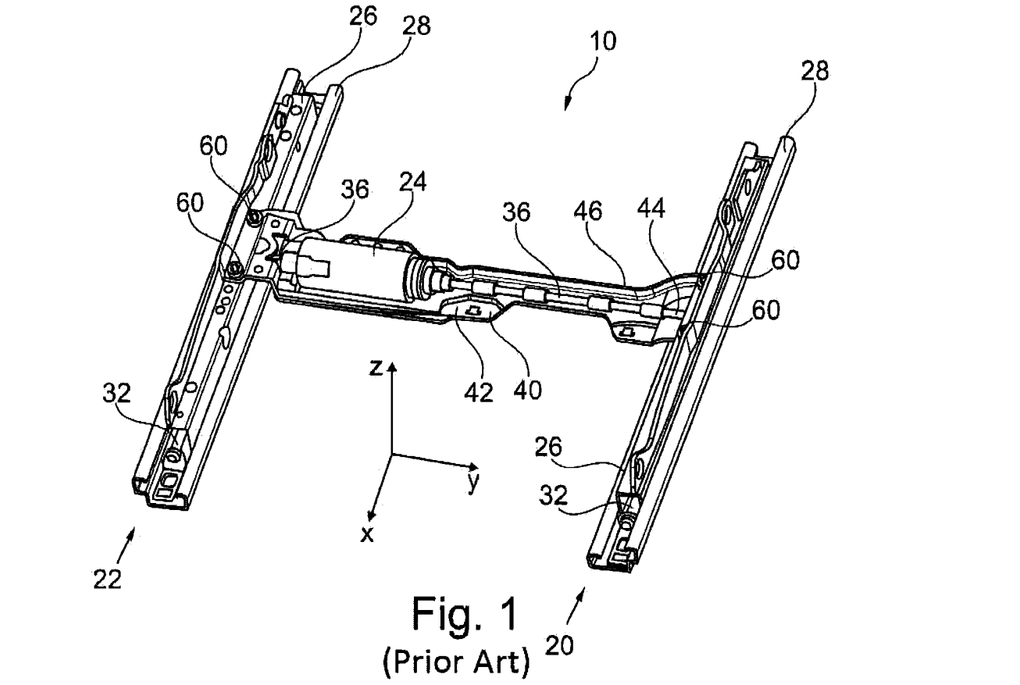
FIG. 1 is a perspective illustration of an adjusting device which is known from the prior art and comprises two pairs of rails, an electric motor and a motor carrier.

FIG. 1 shows an adjusting device 10 which is known from the prior art, is designed as a longitudinal adjusting device and the basic design of which is known, for example, from DE 10 2009 004 365 A1. The adjusting device 10 has a left pair of rails 20 and a right pair of rails 22. It also comprises an electric motor 24 which is arranged between said two pairs of rails 20, 22 and substantially extends in the transverse direction y. Each pair of rails 20, 22 has a seat rail 26 fastenable to a vehicle seat and a floor rail 28 fastenable to a vehicle structure. The two seat rails 26 are displaceable in a direction in relation to the floor rails 28 and carry the remaining parts of the motor vehicle seat. In the present case, the adjusting direction corresponds to the longitudinal direction x, but the adjusting direction can also be oriented at any angle with respect to the longitudinal direction x. An adjusting gearing 32 is accommodated in each pair of rails 20, 22. The adjusting gearing 32 is in each case accommodated within a channel which extends in the longitudinal direction x, is bounded by the pairs of rails 20, 22 and is open on the end side. The adjusting gearing 32 in each case has a rotationally fixed spindle and a spindle nut which is in engagement therewith and is mounted in a gearing housing, not illustrated in the figures, wherein the spindle nut is indirectly drivable by the electric motor 24. Spindle gearings of this type are known, for example, from US 2006/0260424 A1 and U.S. Pat. No. 4,802,374 A.

The electric motor 24 has an output shaft 36. The output shaft 36 is understood as meaning the shaft rotating at the rotational speed of the electric motor 24 and a casing encasing the shaft in sections. The output shaft 36 extends from the adjusting gearing 32 of the left pair of rails 20 to the adjusting gearing 32 of the right pair of rails 22 and runs substantially rectilinearly in the transverse direction y. The electric motor 24 is also oriented with its cylindrical motor body in the transverse direction y.

A motor carrier 40 which substantially extends in the transverse direction y is arranged between the two seat rails 26. The motor carrier 40 is in each case connected to an upper web of the respective seat rail 26 by means of two fastening means, which are designed as screws 60. In addition, the screws 60 fix the respective gearing housing of the adjusting gearing 32 in the seat rails 26. The motor carrier 40 has a double angle in the vicinity of each pair of rails 20, 22. A base 42 of the motor carrier 40 is placed at precisely such a depth in the vertical direction z that the output shaft 36 is arranged level with the gearing housings of the adjusting gearings 32, i.e. can engage directly therein.

The output shaft 36 of the electric motor 24 runs parallel to a direction of extent of the motor carrier 40. Said direction of extent of the motor carrier 40 runs in the transverse direction y. The motor carrier 40 has its greatest extent in the transverse direction y. The motor carrier 40 has a fastening possibility for the electric motor 24. Said fastening possibility is preferably trough-shaped. The motor carrier 40 forms a guide for the output shaft 36.

The motor carrier 40 is produced integrally. The motor carrier 40 is produced from a sheet metal blank. The sheet metal blank is correspondingly deformed, for example is deformed in a pressing process. In an embodiment made of plastic, the motor carrier 40 is preferably produced as an injection molded part in a corresponding mold.

The electric motor 24 is not arranged centrally between the two pairs of rails 20, 22; on the contrary, it is fastened in the direct vicinity of the right pair of rails 22. As a result, the output shaft 36 on the right seat side is significantly shorter than on the left seat side.

A respective passage 44 forming a window is provided in the end regions of the motor carrier 40, more precisely between the two double angled portions. The output shaft 36 projects through one of said passages 44 in each case on each side of the motor carrier 40. The base 42 substantially runs, except for the trough for receiving the electric motor 24, in the transverse direction y and parallel to the output shaft 36. In the longitudinal direction x, the motor carrier 40 has, at each longitudinal edge, a side edge 46 which protrudes upward, i.e. substantially in the vertical direction z. Said side edge is some millimeters high and forms a stiffening portion. Overall, the motor carrier 40 forms a crosspiece which rigidly connects the two seat sides to each other.

Figure 2:
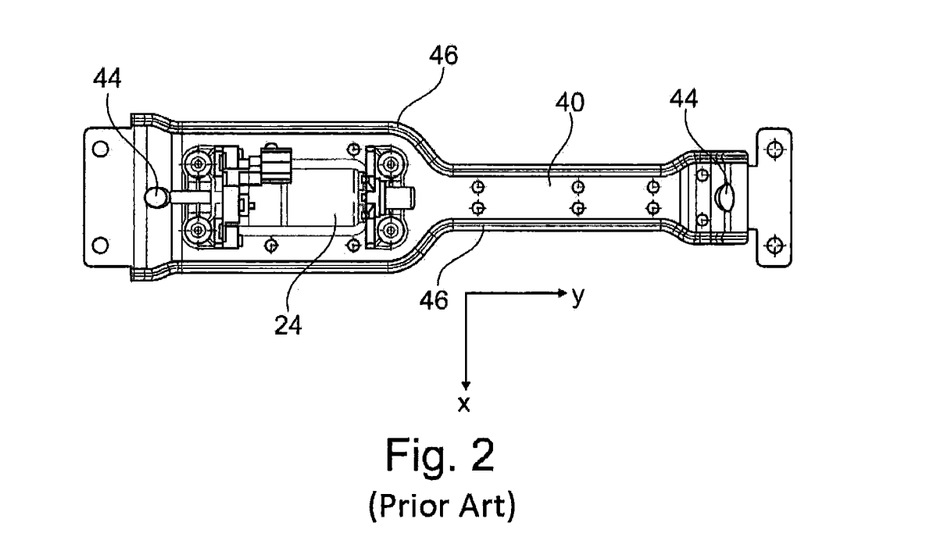
FIG. 2 is a top view of a motor carrier known from the prior art.

FIG. 2 shows a further motor carrier 40 which is known from the prior art and substantially corresponds to the motor carrier 40 which is illustrated in FIG. 1 and has been described previously. In particular, the motor carrier 40 carries an electric motor 24 which in each case drives an adjusting gearing 32 of a pair of rails 20, 22 via an output shaft 36, which is not illustrated in FIG. 2 and runs through the two passages 44.

Figure 3:
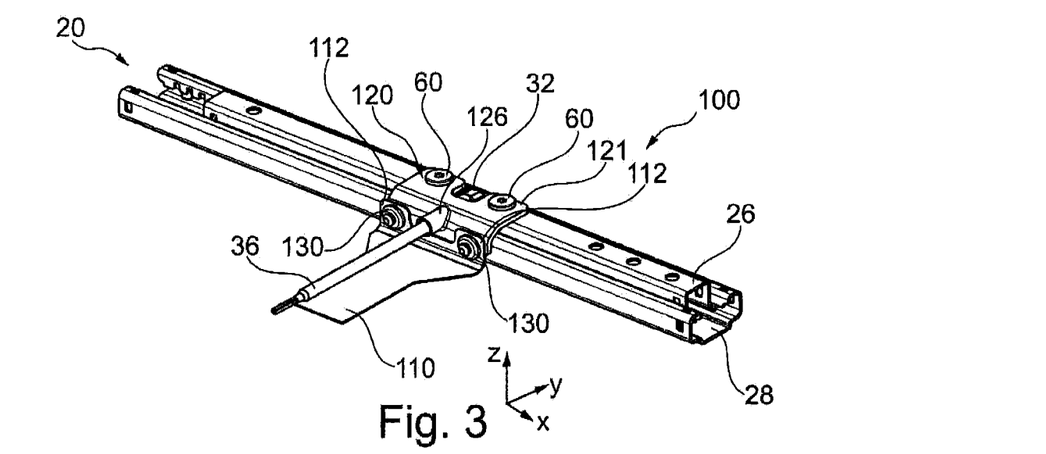
FIG. 3 is a perspective illustration of a portion of a first exemplary embodiment of an adjusting device according to the invention.

FIG. 3 shows part of a first exemplary embodiment of an adjusting device 100 according to the invention. The adjusting device 100 substantially corresponds in respect of function and design to the adjusting device 10 which has previously been described and is known from the prior art. In particular, the two pairs of rails 20, 22 of the adjusting device 100 according to the invention, which each have a seat rail 26 and a floor rail 28, an electric motor 24, an output shaft 36 and a respective adjusting gearing 32 correspond in respect of the respective function and the respective basic design to the prior art and will therefore not be described again in detail below.

A motor carrier 110 which substantially extends in the longitudinal direction x and in the transverse direction y is arranged between the two seat rails 26. The motor carrier 110 has its greatest extent in the transverse direction y. The motor carrier 110 has a fastening possibility for the electric motor 24. The motor carrier 110 forms a guide for the output shaft 36.

The motor carrier 110 in each case has, at its two ends, as viewed in the transverse direction y, a flange 112 protruding upward in the vertical direction z. In addition, the flange 112 runs parallel to the longitudinal direction x. The flange 112 has two openings, in each of which a bearing bushing 130, in the present case a rubber grommet, is inserted. The two bearing bushings 130 are arranged one behind the other in the longitudinal direction x. Between the two bearing bushings 130, the flange 112 is designed in a downwardly stepped manner so as to permit passage of the output shaft 36.

The motor carrier 110 is produced integrally here. The motor carrier 110 is produced from a sheet metal blank The sheet metal blank is correspondingly deformed, for example is deformed in the pressing process.

The motor carrier 110 is mounted on both sides on a respective adapter 120 by means of the bearing bushings 130. The two adapters 120 are each connected to an upper web of the respective seat rail 26 by means of two fastening means, which are designed as screws 60. In addition, the screws 60 fix the respective gearing housing of the adjusting gearing 32 in the seat rail 26. The adapters 120 here are manufactured as a single part from plastic.

The two adapters 120 are mirror-symmetrical with respect to each other. Only one adapter 120 will therefore be described in more detail below. The adapter 120 here is a plastics component. The adapter 120 has a flat basic body 121 which extends parallel to the longitudinal direction x and parallel to the transverse direction y. The basic body 121 rests on top of the seat rail 26. The basic body 121 has two through holes for the screws 60. In the present case, the basic body 121 also has a recess for the gearing housing of the adjusting gearing 32 which protrudes upward slightly from an opening in the seat rail 26. In the transverse direction y and in the direction of the motor carrier 110, the basic body 121 is followed by a receiving body 122 having a double angle downward. A region of the receiving body 122 that faces away from the basic body 121 runs perpendicularly downward, i.e. parallel to the vertical direction z and parallel to the longitudinal direction x.

Two pins 124 are arranged on the receiving body 122 of the adapter 120, here are formed as one piece with the receiving body 122. The pins 124 run parallel to the transverse direction y. The bearing bushings 130 inserted in the flange 112 of the motor carrier 110 can be pushed onto the pins 124 such that the motor carrier 110 can be mounted on the adapter 120 by means of the pins 124.

In addition, the receiving body 122 of the adapter 120 has a hollow-cylindrical receptacle 126 for the mounting of the casing of the output shaft 36. In addition, the receptacle 126 orients the output shaft 36 in the direction of the gearing housing of the adjusting gearing 32.

Figure 4A:
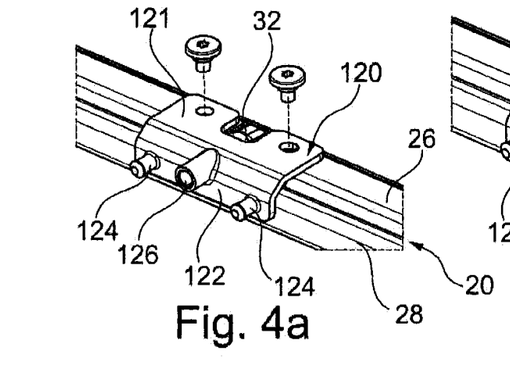
FIG. 4a is a perspective detailed view of the first exemplary embodiment from FIG. 3 during an assembly step.
Figure 4B:
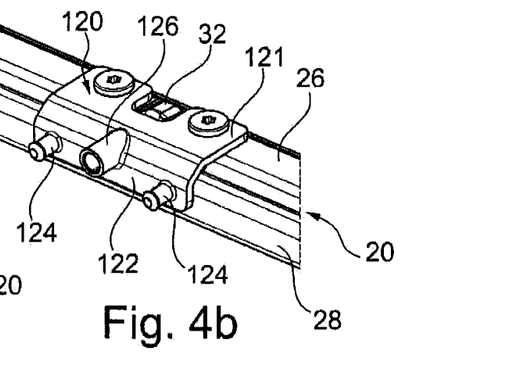

FIGS. 4a to 4d show individual assembly steps of the adjusting device 100. FIGS. 4a, 4b show the assembly of the adapter 120 on the seat rail 26. The adapter 120 is screwed by means of the two screws 60 to the seat rail 26 and to the gearing housing, which is arranged in the seat rail 26, of the adjusting gearing 32 to form an assembly group comprising the pair of rails 20. This results in a testable and transportable assembly group. The adjusting gearing 32 of the assembly group is already fully functional and is testable before assembly of the motor carrier 110.

Figure 4C:
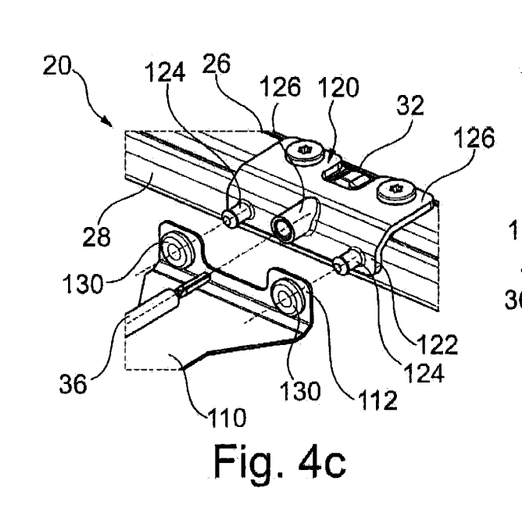
FIG. 4c is a perspective detailed view of the first exemplary embodiment during a further assembly step.
Figure 4D:
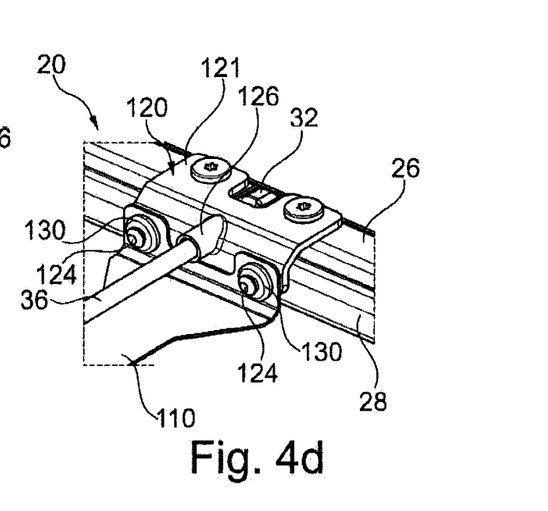
FIG. 4d is a perspective detailed view of the first exemplary embodiment after the assembly step from FIG. 4c.

FIGS. 4c, 4d show subsequent assembly steps, in particular in a different assembly plant. The motor carrier 110 with the electric motor 24 fastened to the motor carrier 110 and the output shaft 36 is first of all mounted here in the transverse direction y on a first of the two seat rails 26. For this purpose, the output shaft 36 is introduced through the receptacle 126 into the gearing housing and the bearing bushings 130 are pushed onto the pins 124. The assembly of the second seat rail 26 on the motor carrier 110 subsequently takes place in an analogous manner.

In addition to the mounting of the motor carrier 110, the bearing bushings 130 designed as rubber grommets serve for the acoustic decoupling of the motor carrier 110 from the adapters 120 and therefore from the seat rails 26, and for damping vibrations. Compensation for tolerances of the rail track size between the two seat rails 26 is ensured via the geometry of the pins 124 of the adapter 120.

Figure 5:
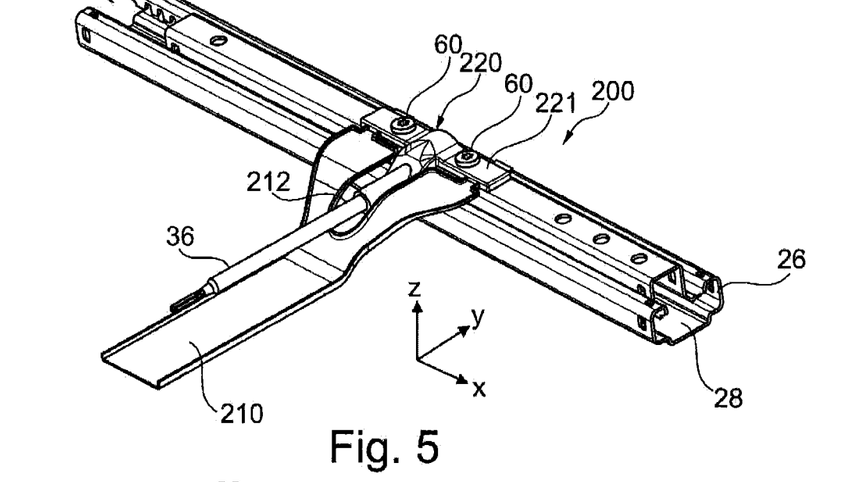
FIG. 5 is a perspective illustration of a portion of a second exemplary embodiment of an adjusting device according to the invention.

FIG. 5 shows part of a second exemplary embodiment of an adjusting device 200 according to the invention. The adjusting device 200, which is designed as a longitudinal adjusting device, substantially corresponds in respect of function and design to the previously described adjusting device 10 known from the prior art. In particular, the two pairs of rails 20, 22 of the adjusting device 200 according to the invention, which each have a seat rail 26 and a floor rail 28, correspond. An electric motor 24, an output shaft 36 and a respective adjusting gearing 32 correspond in respect of the respective function and the respective basic design to the prior art and will therefore not be described again in detail below.

A motor carrier 210 which substantially extends in the longitudinal direction x and in the transverse direction y is arranged between the two seat rails 26. The motor carrier 210 has its greatest extent in the transverse direction y. The motor carrier 210 has a fastening possibility for the electric motor 24. The motor carrier 210 forms a guide for the output shaft 36.

In its two end regions lying opposite each other in the transverse direction y, the motor carrier 210 has a double angle in the vicinity of each pair of rails 20. In the two end regions of the motor carrier 210, more precisely in the region of the two double angled portions, a respective passage 212 is provided which divides the end regions into two halves in each case. The output shaft 36 protrudes through one of said passages 212 on each side of the motor carrier 210.

In the two end regions, the motor carrier 210 has two fingers 214 which protrude outward in the transverse direction y. In the present case, the two halves of the end regions of the motor carrier 210 each have precisely one finger 214. The two fingers 214 each have an upwardly protruding edge 216 on two sides running parallel to the transverse direction y. The fingers 214 therefore have a cross section which is profiled in a U-shaped manner.

In the present case, the motor carrier 210 is produced integrally. The motor carrier 210 is produced from a sheet metal blank The sheet metal blank is correspondingly deformed, for example is deformed in the pressing process. In an embodiment made from plastic, the motor carrier 210 is preferably produced as an injection molded part in a corresponding mold.

The motor carrier 210 is mounted on both sides on a respective adapter 220 by means of the fingers 214. The two adapters 220 are each connected to an upper web of the respective seat rail 26 by means of two fastening means, which are designed as screws 60. In addition, the screws 60 fix the respective gearing housing of the adjusting gearing 32 in the associated seat rail 26. The adapters 220 in the present case are manufactured as a single piece from plastic.

The two adapters 220 are mirror-symmetrical with respect to each other. Only one adapter 220 is therefore described in more detail below. In the present case, the adapter 220 is a plastics component. The adapter 220 has a basic body 221 which is flat in sections and extends parallel to the longitudinal direction x and parallel to the transverse direction y. The basic body 221 rests on top of the seat rail 26. The basic body 221 has two through holes for the screws 60. In the present case, the basic body 221 also has a curvature 222, under which the gearing housing of the adjusting gearing 32 is arranged, said adjusting gearing protruding slightly upward out of an opening in the seat rail 26. The basic body 221 has two receiving openings 223 which are designed in such a manner that the fingers 214 can be pushed in the transverse direction y into the receiving openings 223. The receiving openings 223 are shaped in a complementary manner to the fingers 214.

In the transverse direction y and in the direction of the motor carrier 210, the curvature 222 is adjoined by a hollow-cylindrical receptacle 224 for the mounting of the output shaft 36, in particular a casing of the output shaft 36. In addition, the receptacle 224 orients the output shaft 36 in the direction of the gearing housing of the adjusting gearing 32.

Figure 6A:
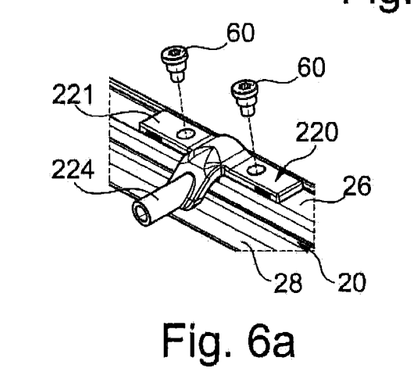
FIG. 6a is a perspective detailed view of the second exemplary embodiment from FIG. 5 during an assembly step.
Figure 6B:
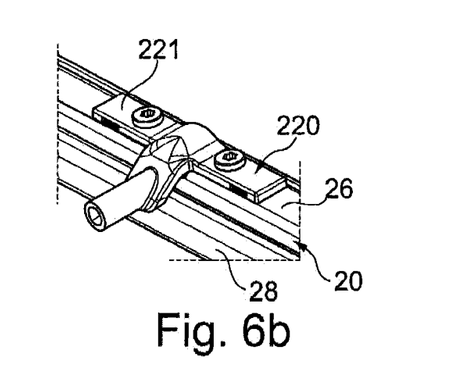

FIGS. 6a to 6d show individual assembly steps of the adjusting device 200. FIGS. 6a, 6b show the assembly of the adapter 220 on the seat rail 26. The adapter 220 is screwed by means of the two screws 60 to the seat rail 26 and to the gearing housing, which is arranged in the seat rail 26, of the adjusting gearing 32 to form an assembly group comprising the pair of rails 20. This results in a testable and transportable assembly group. The adjusting gearing 32 of the assembly group is already fully functional and is testable before assembly of the motor carrier 210.

Figure 6C:
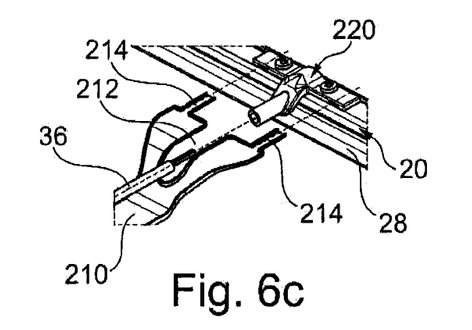
FIG. 6c is a perspective detailed view of the second exemplary embodiment during a further assembly step.
Figure 6D:
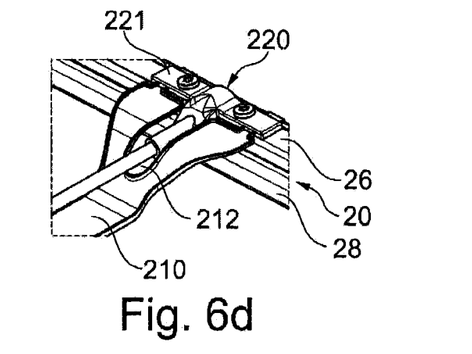
FIG. 6d is a perspective detailed view of the second exemplary embodiment after the assembly step from FIG. 6c.
Figure 7:
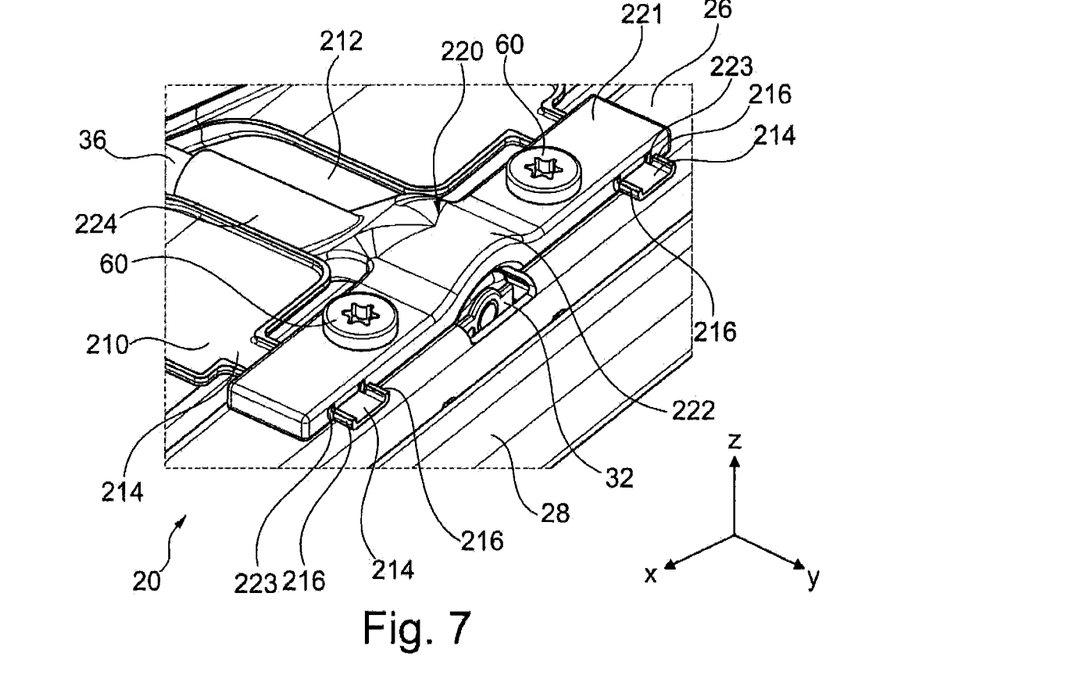
FIG. 7 is a further detailed view of the second exemplary embodiment from a viewing direction different from FIG. 5 and during an assembly step which is located in terms of time between the assembly steps shown in FIGS. 6c and 6d.
Figure 8:
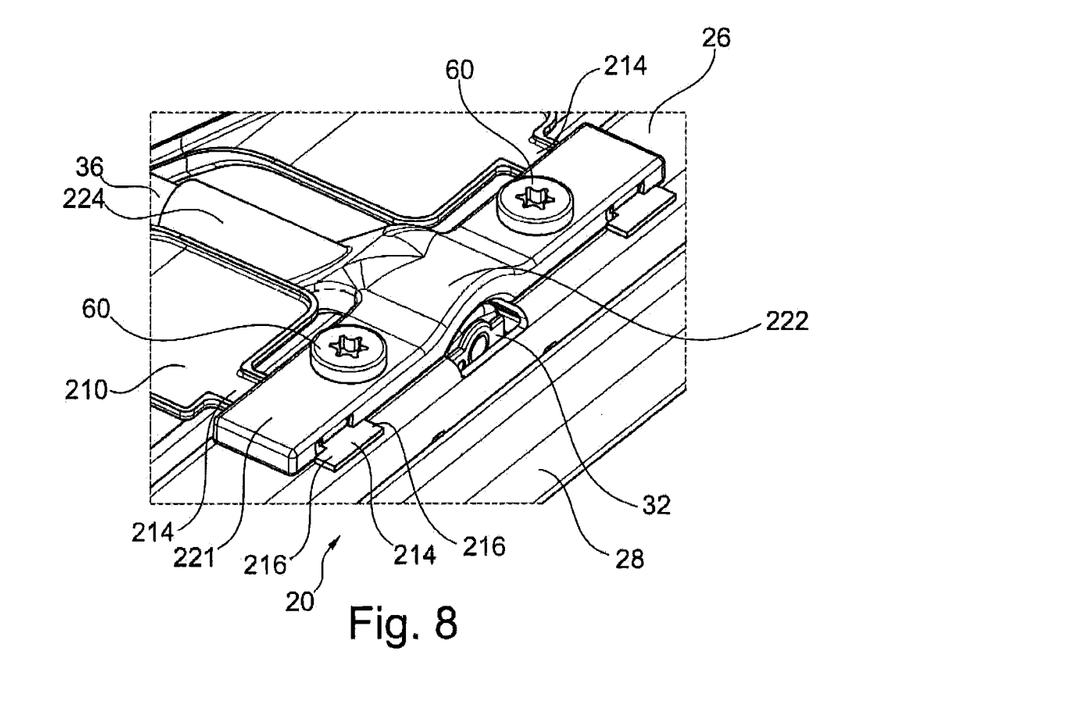
FIG. 8 is a detailed view of the second exemplary embodiment after the assembly step from FIG. 7, wherein an assembly step corresponding to FIG. 6d is shown.

FIGS. 6c, 6d show subsequent assembly steps, in particular in a different assembly plant. The motor carrier 210 with the electric motor 24 fastened to the motor carrier 210 and with the output shaft 36 in the transverse direction y is first of all mounted here on one of the two seat rails 26. For this purpose, the output shaft 36 is introduced through the receptacle 224 into the gearing housing and the fingers 214 are pushed into the receiving openings 223. A portion of the fingers 214 protrudes here from the basic body 221 on that side of the adapter 220 which faces away from the motor carrier 210. The edge 216 of the fingers 214 is notched in such a manner that those portions of the edges 216 which protrude from the basic body 221 can be bent over in order to fix the fingers 214, and therefore the motor carrier 210, in the transverse direction y. FIG. 7 shows the fingers 214 of the motor carrier 210, said fingers having been plugged into the receiving openings 223 in the adapter 220. FIG. 8 shows the bent-over portions of the edges 216. The assembly of the second seat rail 26 on the motor carrier 210 takes place in an analogous manner.

The mounting of the motor carrier 210 by means of the fingers 214 in the adapter 220 serves for the acoustic decoupling of the motor carrier 210 from the adapters 220 and therefore from the seat rails 26, and for damping vibrations. Compensation of tolerances from the rail track size between the two seat rails 26 is ensured via the geometry, in particular the length of the fingers 214.

The features disclosed in the above description, in the claims and in the drawings may be of importance both individually and in combination for realizing the invention in its various refinements.

Although the invention has been described in detail in the drawings and the preceding description, the descriptions should be understood as being illustrative and exemplary and not restrictive. In particular, the selection of the graphically illustrated proportions of the individual elements should not be interpreted as required or restrictive. Furthermore, the invention is in particular not restricted to the exemplary embodiments explained. Further variants of the invention and the implementation thereof will be apparent to a person skilled in the art from the preceding disclosure, the figures and the claims.

Terms, such as "comprise", "have", "include", "contain" and the like which are used in the claims do not rule out further elements or steps. The use of the indefinite article does not rule out a plural. A single device can carry out the functions of a plurality of units or devices mentioned in the claims.

While specific embodiments of the invention have been shown and described in detail to illustrate the application of the principles of the invention, it will be understood that the invention may be embodied otherwise without departing from such principles.

The invention claimed is:

1. An adjusting device for a vehicle seat, the adjusting device comprising:
   a first adjustable assembly with first adjustable assembly adjusting gearing and at least one first assembly rail;
   a second adjustable assembly with second adjustable assembly adjusting gearing and at least one second assembly rail;
   an electric motor;
   at least one output shaft,
   wherein the electric motor is operatively connected both to the first adjustable assembly adjusting gearing and to the second adjustable assembly adjusting gearing by the at least one output shaft;
   adapters; and
   a motor carrier which receives the electric motor,
   wherein the motor carrier is fastened to each of the two adjustable assemblies by one of the adapters,
   wherein the motor carrier is manufactured integrally from a metallic material as a single integral metallic motor carrier, and
   the adapters are manufactured from a non-metallic material as non-metallic adapters;
   wherein the adaptors each have an L-shape defined by a flat body connected to an angled receiving body, wherein said angled receiving body receives said motor carrier and said flat body receives one of said rails from said assemblies.

2. The adjusting device as claimed in claim 1, wherein the motor carrier is manufactured from steel plate.

3. The adjusting device as claimed in claim 1, wherein the adapters are manufactured from a plastic.

4. The adjusting device as claimed in claim 1, wherein at least one of the adapters has at least one pin for receiving the motor carrier.

5. The adjusting device as claimed in claim 4, wherein the at least one pin is oriented in a transverse direction.

6. The adjusting device as claimed in claim 5, wherein the motor carrier has at least one bearing bushing which is inserted into an opening in the motor carrier, and the bearing bushing is plugged onto the at least one pin.

7. The adjusting device as claimed in claim 6, wherein the bearing bushing is a rubber grommet.

8. The adjusting device as claimed in claim 1, wherein the motor carrier has at least one finger which is pushed into a receiving opening in at least one of the adapters.

9. The adjusting device as claimed in claim 8, wherein the at least one finger is pushed in the transverse direction into the receiving opening.

10. The adjusting device as claimed in claim 8, wherein the receiving opening is shaped to be complementary to the at least one finger.

11. The adjusting device as claimed in claim 10, wherein said output shaft of said electric motor extends axially along said motor carrier and transverse said rails.

12. The adjusting device as claimed in claim 8, wherein the at least one finger is deformed such that the at least one finger is held in form-fitting in the transverse direction in the receiving opening by a region which is deformed after the motor carrier is mounted onto the adapters.

13. The adjusting device as claimed in claim 12, wherein the deformed region is an edge of the finger.

14. The adjusting device as claimed in claim 1, wherein the adjusting device is a longitudinal adjusting device.

15. The adjusting device as claimed in claim 1, wherein said flat body has a recess adapted to receive a gear housing therein.

16. The adjusting device as claimed in claim 1, wherein said flat body has two through holes adapted to receive mechanical fasteners that extend through the through holes and into said rails.

17. The adjusting device as claimed in claim 1, wherein said receiving body has two downwardly angled walls.

18. The adjusting device as claimed in claim 17, wherein said second downwardly angled wall is substantially transverse said flat body.

19. The adjusting device as claimed in claim 18, wherein said second downwardly angled wall as two pins adapted to connect with apertures on said motor carrier.

20. A method for assembling an adjusting device, comprising;
a first adjustable assembly with first adjustable assembly adjusting gearing and at least one first rail assembly,
a second adjustable assembly with second adjustable assembly adjusting gearing and at least one second rail assembly,
an electric motor,
at least one output shaft,
wherein the electric motor is operatively connected both to the first adjustable assembly adjusting gearing and to the second adjustable assembly adjusting gearing by the at least one output shaft,
adapters; and
a motor carrier which receives the electric motor,
wherein the motor carrier is fastened to each of the two adjustable assemblies by one of the adapters,
wherein the motor carrier is manufactured integrally from a metallic material as a single integral metallic motor carrier, and
the adapters are manufactured from a non-metallic material as non-metallic adapters,
wherein the adaptors each have an L-shape defined by a flat body connected to an angled receiving body, wherein said angled receiving body receives said motor carrier and said flat body receives one of said rails from said assemblies,
the method comprising the steps of:
first fastening the adapters to the respectively assigned adjustable assembly;
and, in a further method step, connecting the motor carrier to the adapters.

\* \* \* \* \*